March 21, 1933.   A. B. WALTER   1,902,740
COMBINATION JACK AND SHOCK ABSORBING STRUCTURE
Filed Sept. 30, 1931   4 Sheets-Sheet 1

Inventor
A. B. Walter
By Clarence A. O'Brien
Attorney

March 21, 1933.  A. B. WALTER  1,902,740
COMBINATION JACK AND SHOCK ABSORBING STRUCTURE
Filed Sept. 30, 1931  4 Sheets-Sheet 2

Inventor
A. B. Walter
By Clarence A. O'Brien
Attorney

March 21, 1933. A. B. WALTER 1,902,740
COMBINATION JACK AND SHOCK ABSORBING STRUCTURE
Filed Sept. 30, 1931 4 Sheets-Sheet 3

Inventor
A. B. Walter

By Clarence A. O'Brien
Attorney

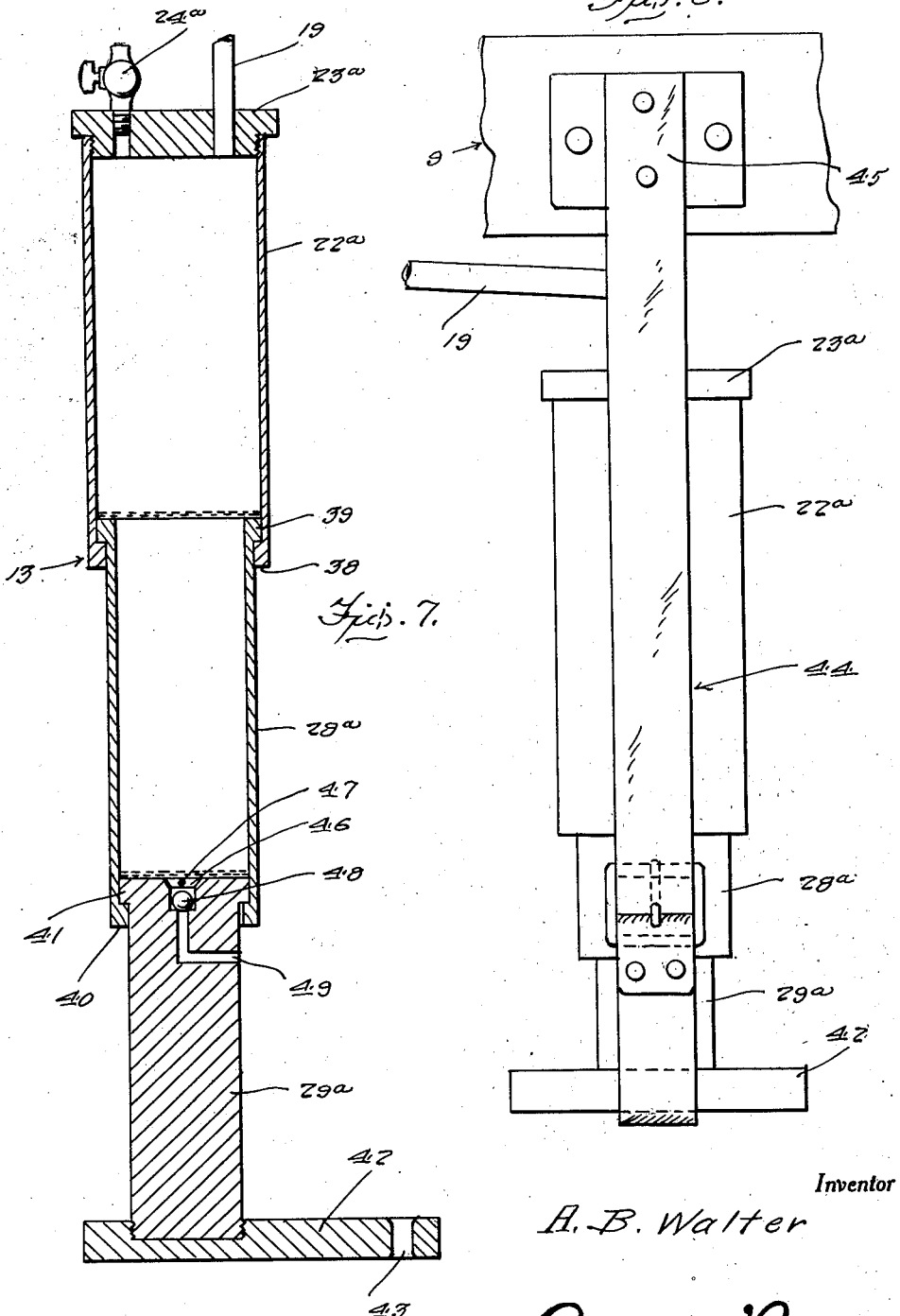

Patented Mar. 21, 1933

1,902,740

UNITED STATES PATENT OFFICE

ALBERT BERT WALTER, OF ELM GROVE, WEST VIRGINIA

COMBINATION JACK AND SHOCK ABSORBING STRUCTURE

Application filed September 30, 1931. Serial No. 566,102.

This invention relates to an improved structure for application to present day motor vehicle frames, and it has more specific reference to a multiple pneumatic jack arrangement wherein the jacks also function as shock absorbers.

The preferred embodiment of the invention comprehends the use of a pair of front and rear lifting jacks permanently attached to the vehicle frame, the jacks being of a collapsible type and constructed to permit any one or all of the wheels to be lifted off of the ground for tire exchanging and general repair work.

One of the principal features of the invention is the employment of a construction wherein the lifting jacks are collapsed and disposed in an out-of-the-way position for normal running purposes, said jacks then function as shock absorbers or snubbers.

My primary aim is to generally improve upon structures of this class by providing a novel arrangement characterized by efficiency and simplicity and capable of fulfilling the requirements of an invention of this class.

In the drawings:

Figure 2 is a front elevation of Figure 1.

Figure 3 is a detail elevation of one of the front jacks collapsed and serving as a shock absorber.

Figure 4 is a view of the same jack seen in Figure 3 with the extensible leg disposed in a position for hoisting or lifting purposes.

Figure 6 is a view of the same rear jack collapsed and serving as a snubber or shock absorber.

Figure 7 is a longitudinal sectional view through the extended jack depicted in Figure 5.

Figure 1:
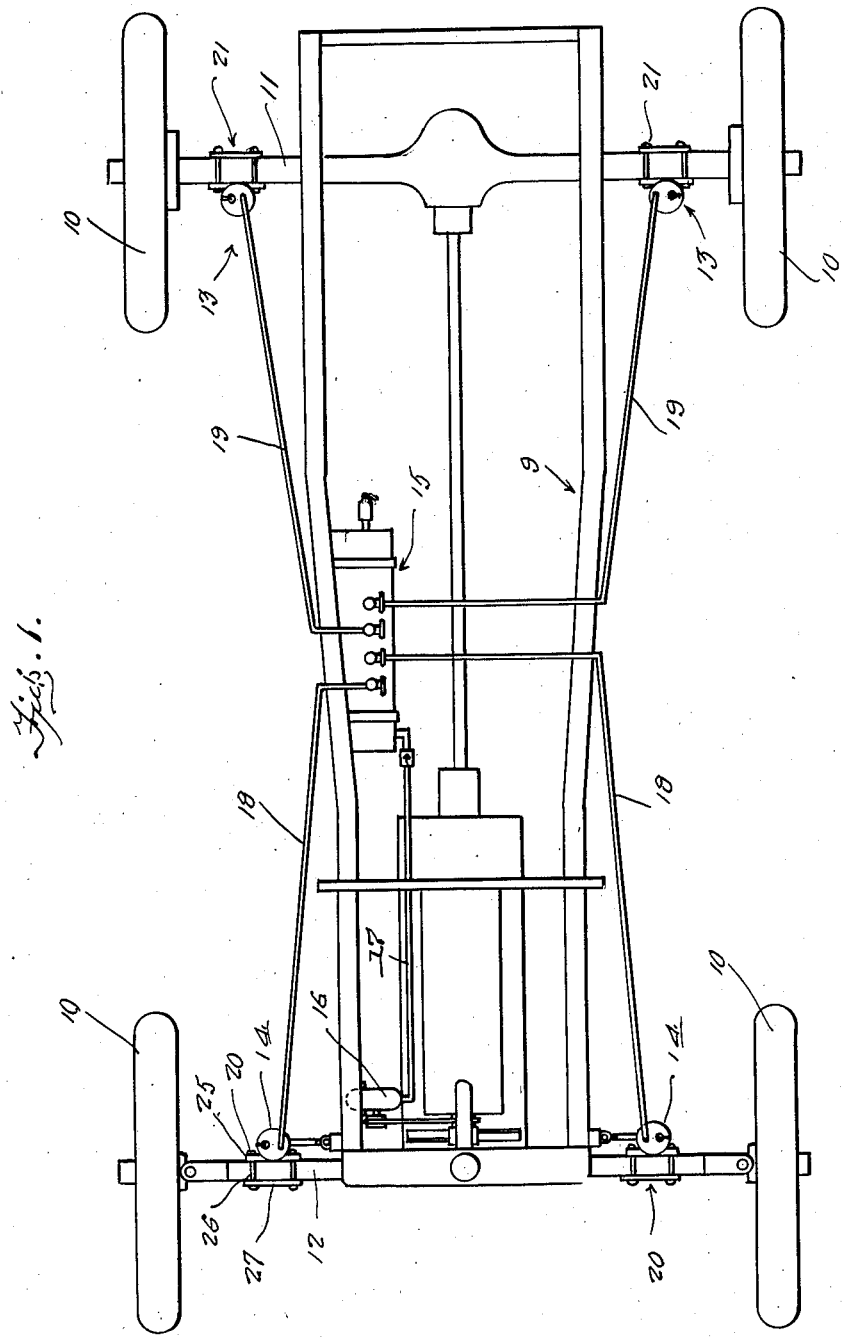
Figure 1 is a top plan view of a conventional wheel-supported chassis showing the novel jack assembly thereon.
Figure 5:
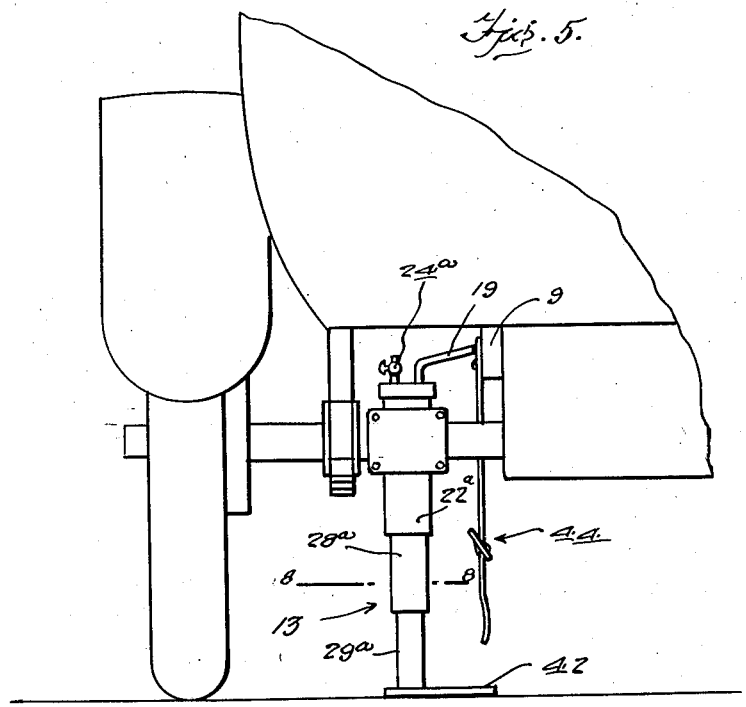
Figure 5 is a fragmentary rear elevational view showing the rear jack extended for hoisting purposes.
Figure 8:
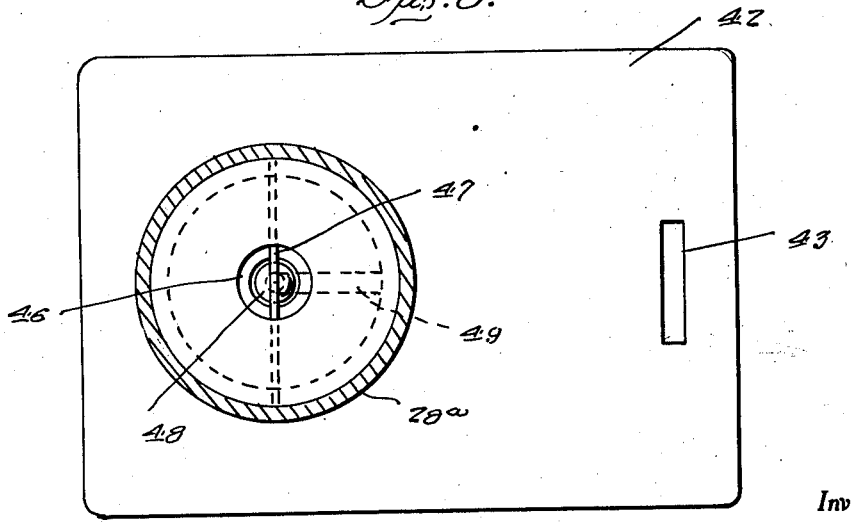
Figure 8 is a cross section on the line 8—8 of Figure 5.

In Figure 1, the frame is designated by the numeral 9 and the wheels by the numerals 10, the rear axle is indicated generally by the numeral 11, and the front axle by the numeral 12. The rear pair of jacks is distinguished from the front pair and denoted by the numeral 13 while the front jacks are represented by the numeral 14.

The numeral 15 represents a suitable air reservoir supplied from a pump 16 by way of a delivery pipe 17. Secured to the reservoir by valved connection for selective operation, are the compressed air supply pipes leading from the reservoir to the jacks. The front pipes are distinguished by the numerals 18 and the rear pipes by the numerals 19. Suitable clamps 20 and 21 are provided for mounting the jacks on the respective axles. Incidently the term "jacks" is used broadly to comprehend the devices employed for lifting as well as shock-absorbing purposes.

The front jacks are of duplicate construction, and a description of one will suffice for both. Attention is invited therefore to Figures 3 and 4. Here the main cylinder is denoted by the numeral 22 and this has a cap 23 provided with an air relief valve 24. Near the bottom of the cylinder is an extension 25 carrying connecting bolts 26 cooperable with the clamping plate 27 to complete the clamp for fastening the entire structure to the axle.

Slidable in the cylinder 22 is an inner telescoping cylinder 28 which in turn serves to accommodate the piston 29. This makes a sort of dashpot arrangement. The piston 29 is valved and also provided with a headplate 30. The jack leg or standard is of an extensible type and comprises a tubular section 31 hingedly connected at 32 to the plate and an extensible rod 33 fitting in the tube and provided with keeper notches 34 with which the retaining latch 35 is selectively co-operable.

The leg takes the position seen in Figure 4, when the device is employed as a lifting jack. When used as a shock absorber it takes the position seen in Figure 3 at which time the entire leg is folded up and secured by suitable pins 36 to a bracket 37 on the frame. This provides the desired operating connection between the multiple piston, cylinder and frame and axle arrangement.

It is evident therefore that the one device serves as a lifting jack as well as a pneumatic shock absorber under normal running conditions. This is believed to be a unique combination in a structure of this general classification.

The rear jack 13 shown in Figure 7 is detailed more clearly, but the parts are essentially the same. For example, the main cylinder is indicated at 22a and the closing cap at 23a. The blow-off valve is represented by the ordinal 24a. The cylinder 22a is provided at its bottom with an annular shoulder 38 with which a similar shoulder 39 on the intermediate or inner cylinder 28a. In fact, the cylinder 28a is also provided at its bottom with an annulus or shoulder 40 with which the head 41 of the piston 29a is engageable. The piston 29a carries a foot or baseplate 42 slotted at 43 to accommodate a buckle equipped connecting strap 44. This strap has its buckled end fastened to the slot 43 and its opposite end secured as indicated at 45 to the chassis.

In Figure 7, the numeral 46 represents a socket bridged by a retaining pin 47 for the ball check valve 48. This valve is co-operable with the L-shaped air inlet duct 49 formed in the solid piston. This same valve arrangement is used in the front jack and it is believed to be necessary to show but one form thereof to comprehend both arrangements. Thus, as before stated, the devices are fundamentally the same, except that in the front jack I provide an extensible leg and use the leg as an operating connection between the frame and jack when the jack is used as a shock absorber.

In Figure 6, a strap 44 is substituted, and this is the primary distinction between the two forms of jacks.

The gist of the invention, generically interpreted, comprises a multiple cylinder and valved piston arrangement wherein the foot plate on the piston serves as a rest in one instance, and as a means for connecting the jack to the chassis in the other instance. Briefly then, the jack is somewhat in the nature of a dashpot operatively connected by a valved pipe to a reservoir, whereby to permit the desired extensible and collapsible operation to permit the structure to be employed in one instance as a vehicle lifting jack permanently attached, and in the second instance as a shock absorbing device.

Incidently, when collapsing the jack in Figure 7 from the extended state sufficient air is permitted to discharge from the cylinder by way of the release valve 24a, retaining sufficient of the compressed air to provide for the requisite shock absorbing properties.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In a structure of the class described, in combination, a wheel supported axle, a vehicle frame connected thereto, a fluid actuated lifting jack clamped on said axle, said jack embodying a cylinder, an air supply pipe connected thereto, an air release valve also connected thereto, a piston slidable in said cylinder, said piston being provided with a base plate constituting a foot, and adjustable means for connecting the foot to said frame, whereby to permit the jack to have the additional function of a pneumatic shock absorber when partially collapsed for normal running conditions.

2. A combination jack and shock absorber comprising a cylinder, an air pipe connected thereto, an air releasing valve also connected thereto, an inner cylinder telescopically slidable in said first named cylinder, a piston slidable in said inner cylinder, a foot plate carried by said piston, said first named cylinder being provided with a clamp adapted to be secured on an axle, and means for operatively connecting said foot plate adjustably with a vehicle frame.

3. A combination jack and shock absorber comprising a cylinder, an air pipe connected thereto, an air releasing valve also connected thereto, an inner cylinder telescopically slidable in said first-named cylinder, a piston slidable in said inner cylinder, a foot plate carried by said piston, said first named cylinder being provided with a clamp adapted to be secured on an axle, and means for operatively connecting said foot plate adjustably with a vehicle frame, said means comprising an adjustable strap.

4. In a structure of the class described, a main cylinder provided at its lower end with an extension having bolts to accommodate a clamping plate to permit said cylinder to be fastened on an axle, a closing head for the upper end of the cylinder, a relief valve carried by said head, an air supply pipe connected with said head, an inner cylinder slidable in said first-named cylinder, a piston slidable in said inner-cylinder, a plate secured rigidly to the lower end of said piston, an extensible leg comprising a tubular section hingedly attached to the bottom of said plate, a latch carried by said tube, and a rod section slidable in said tube and provided with notches for accommodating the latch.

5. In a structure of the class described, a main cylinder provided at its lower end with an extension having bolts to accommodate a clamping plate to permit said cylinder to be fastened on an axle, a closing head for the upper end of the cylinder, a relief valve carried by said head, an air supply pipe connected with said head, an inner cylinder slidable in said first-named cylinder, a piston slidable in said inner cylinder, a plate secured rigidly to the lower end of said piston, an extensible leg comprising a tubular section hingedly attached to the bottom of said plate, a latch carried by said tube, a rod section slidable in said tube and provided with notches for accommodating the latch, together with means for attachment to a vehicle frame, said means being adapted to receive and hold the extensible leg in a predetermined state when the jack is partially collapsed so as to permit it to serve as a pneumatic shock absorber in the manner described.

In testimony whereof I affix my signature.

ALBERT BERT WALTER.